J. H. PEARSON.
BALING PRESS.
APPLICATION FILED JULY 22, 1918.
1,321,548.
Patented Nov. 11, 1919.
6 SHEETS—SHEET 1.
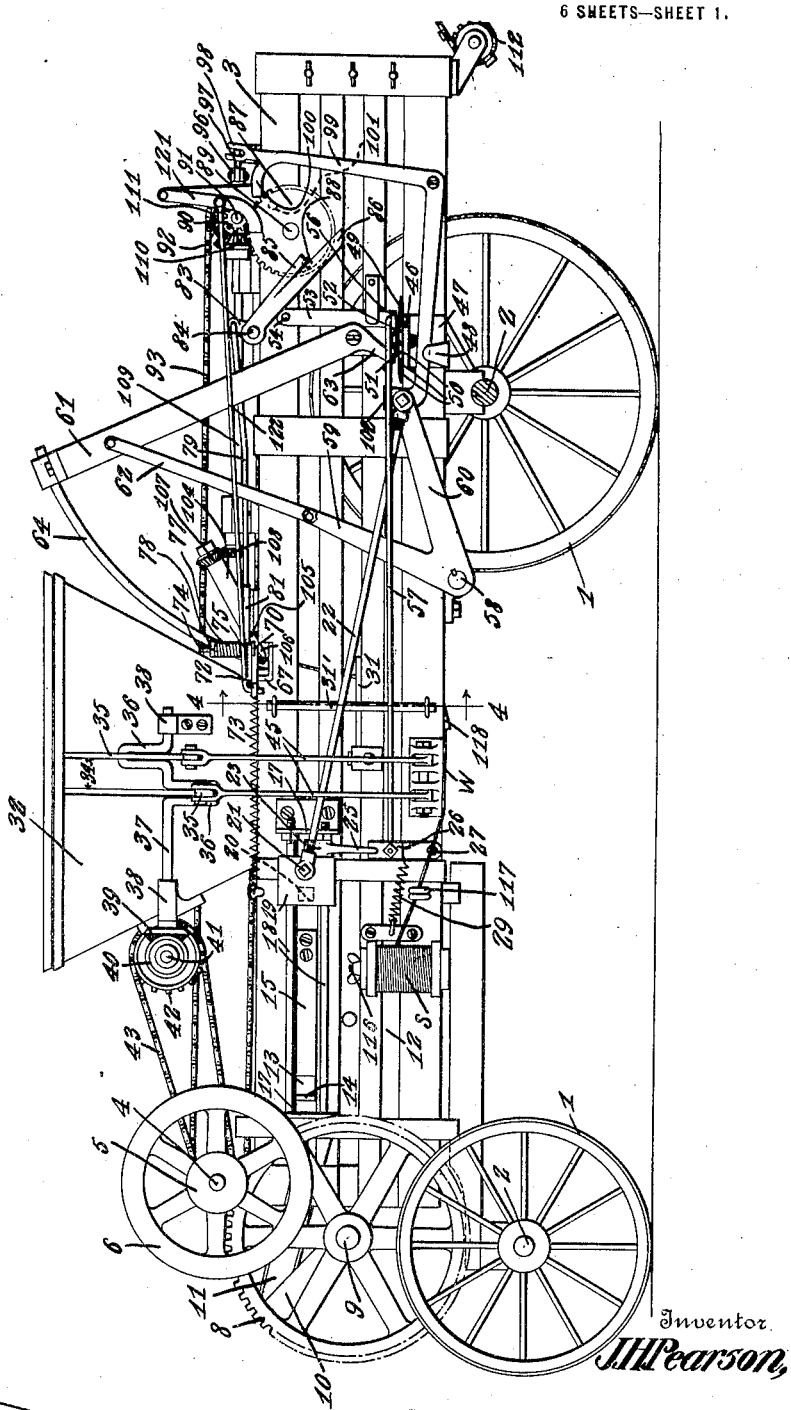
Fig. 1.
Witness
Inventor
J. H. Pearson,
By C. A. Snow & Co.
Attorneys

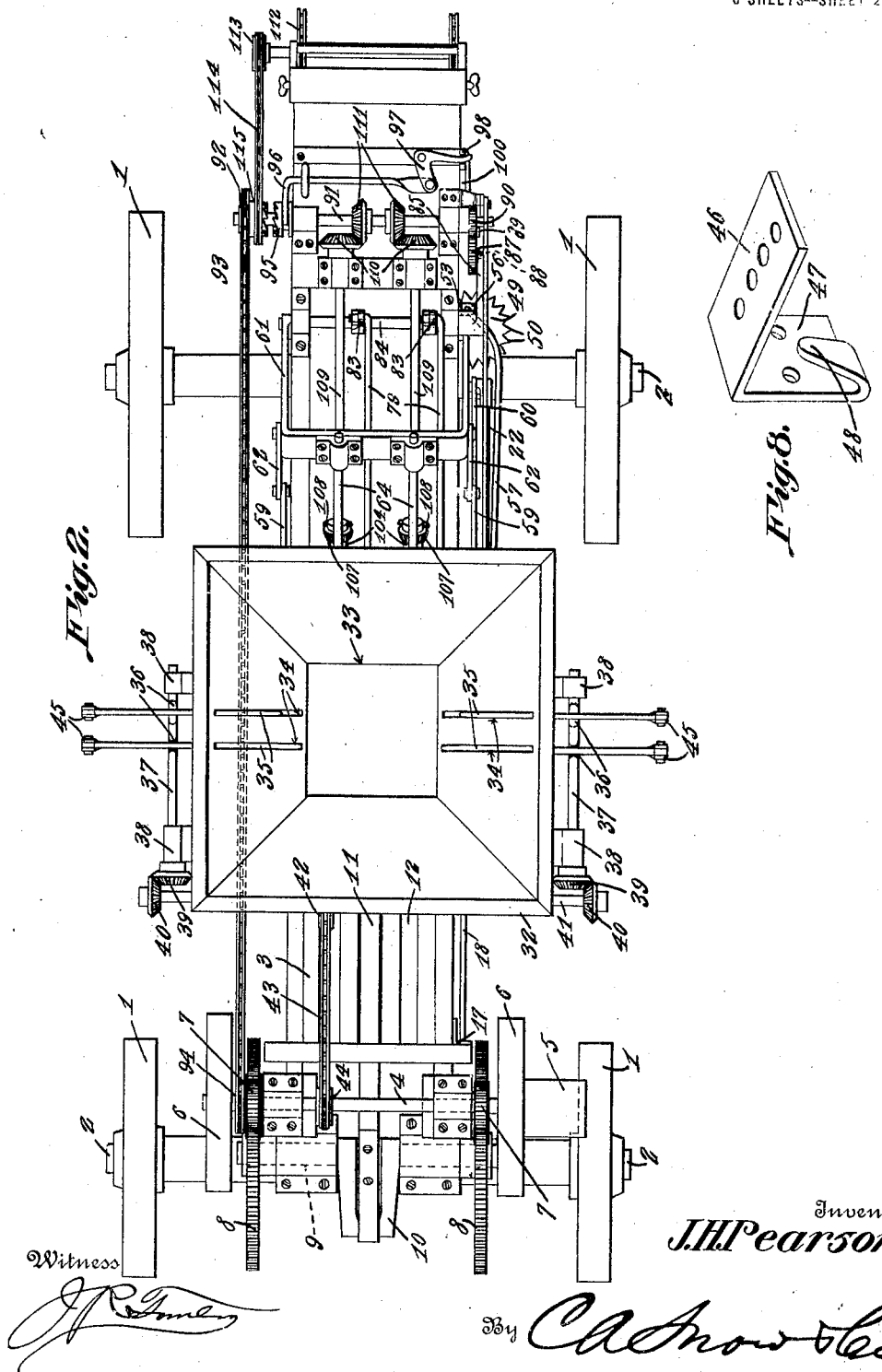

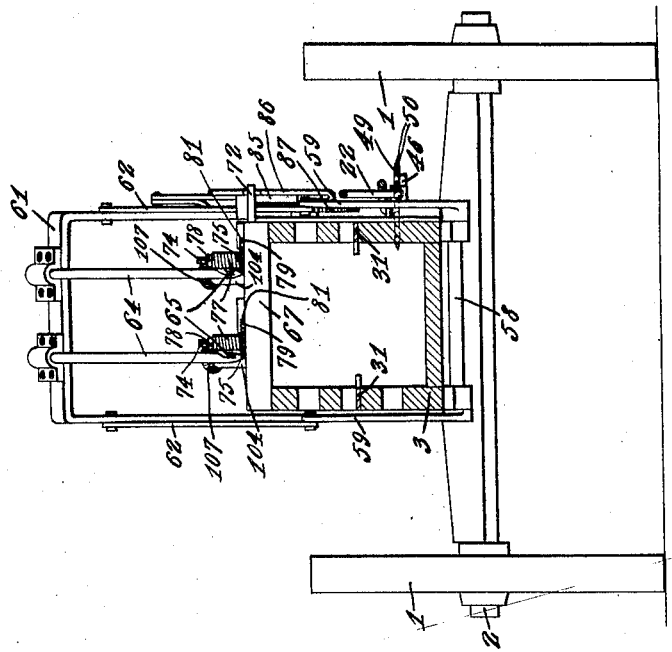

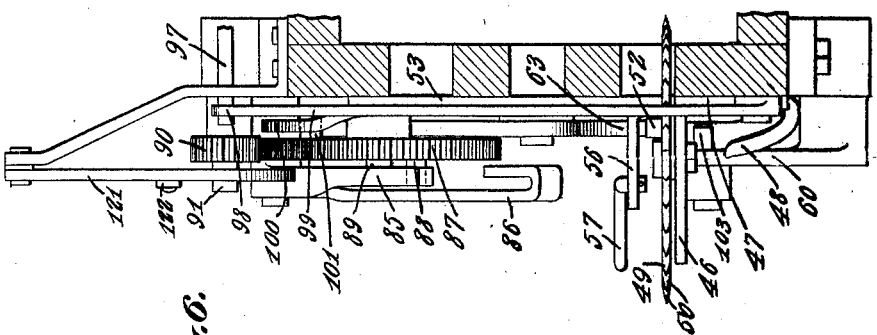
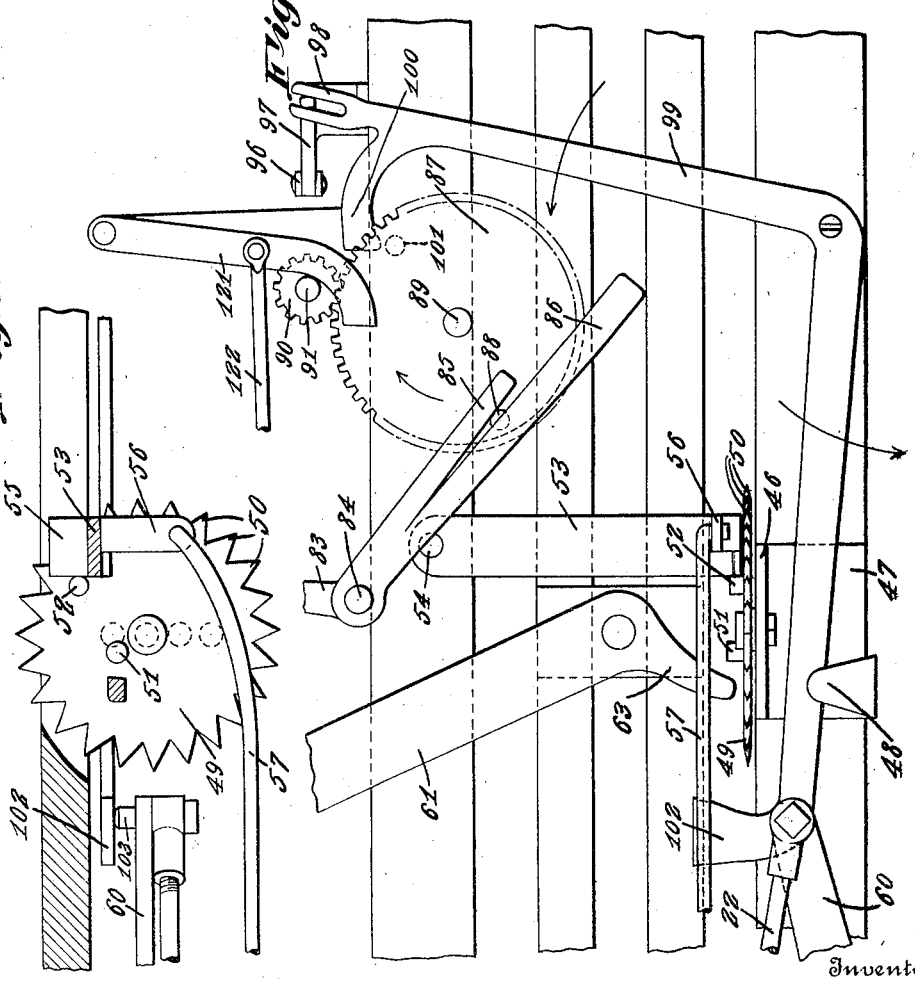

J. H. PEARSON.
BALING PRESS.
APPLICATION FILED JULY 22, 1918.
1,321,548.
Patented Nov. 11, 1919.
6 SHEETS—SHEET 5.
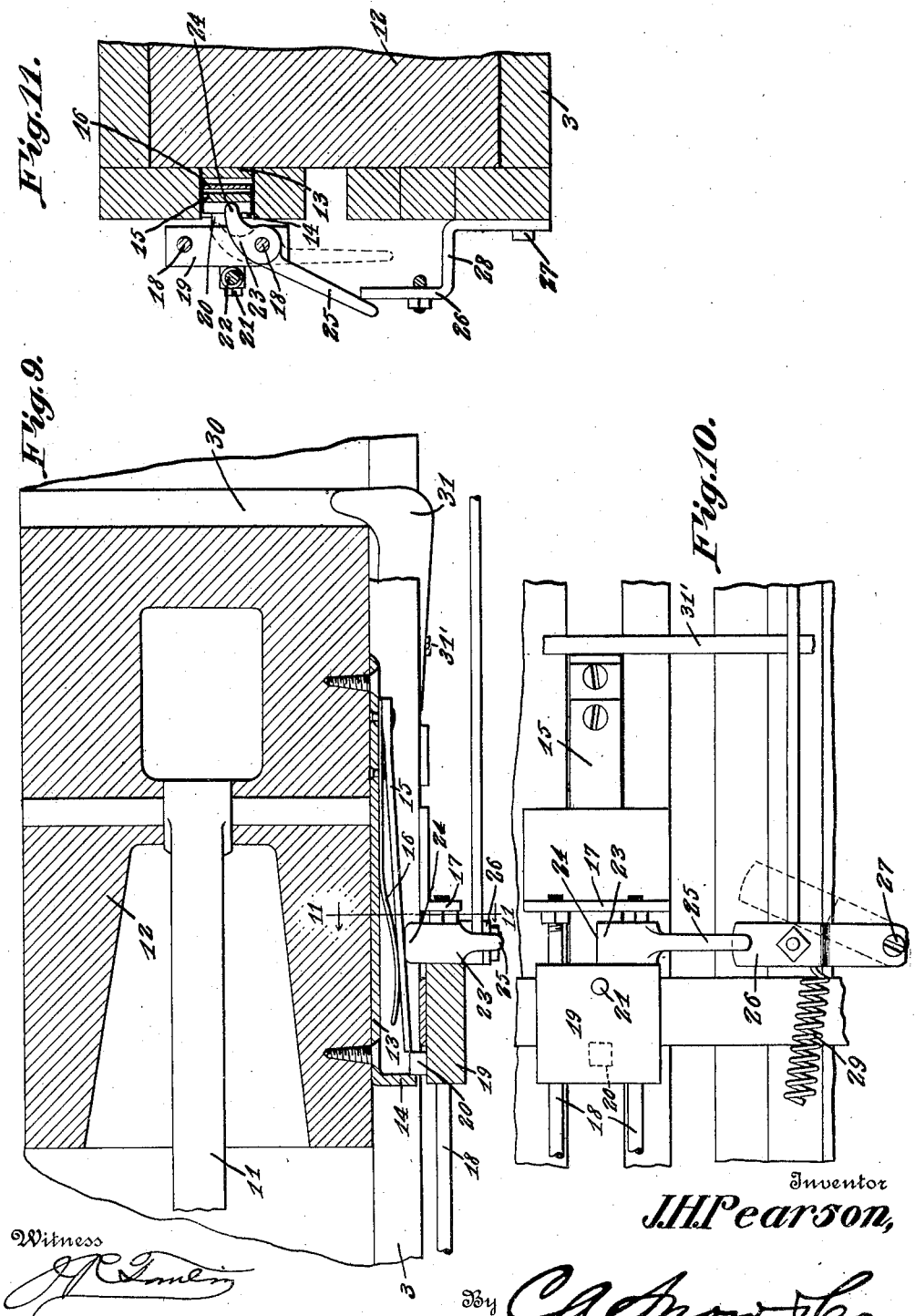
Inventor
J.H.Pearson,
Witness
By C.A.Snow & Co.
Attorneys

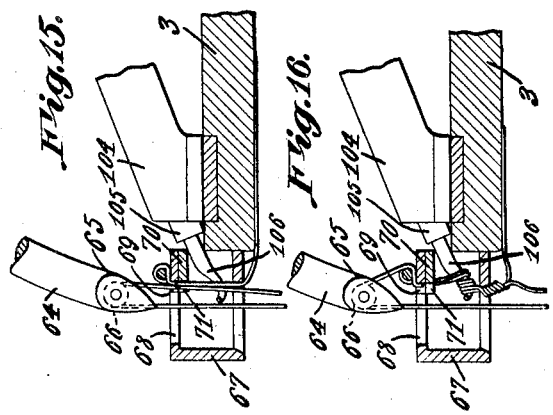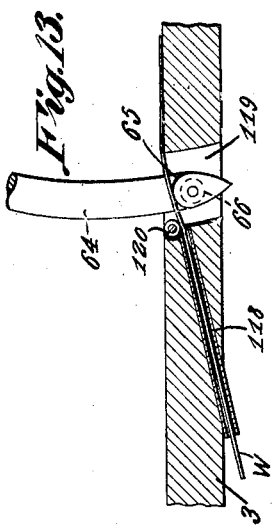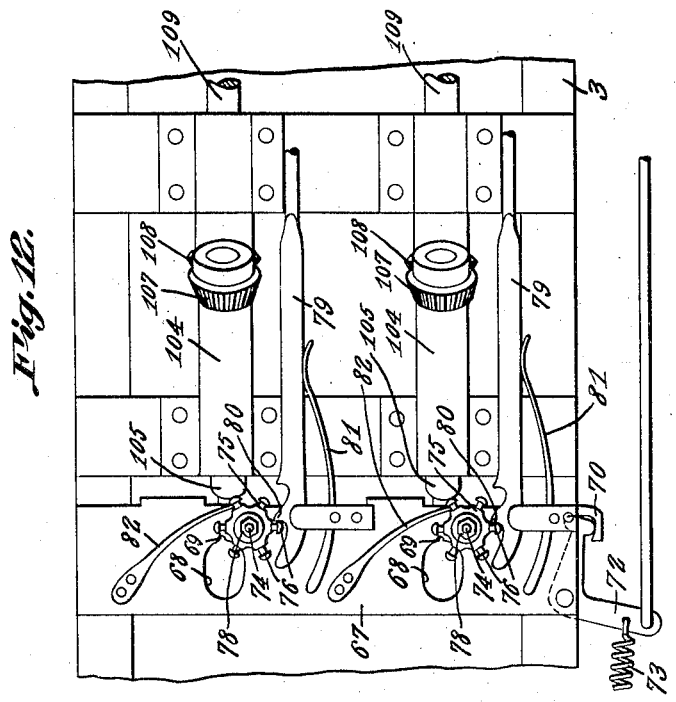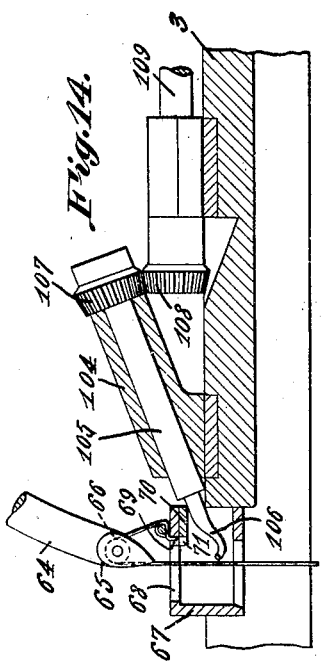

UNITED STATES PATENT OFFICE.

JAMES H. PEARSON, OF BLOOMFIELD, INDIANA, ASSIGNOR OF ONE-THIRD TO CHARLES E. FULLER AND ONE-THIRD TO JAMES HASLER, BOTH OF BLOOMFIELD, INDIANA.

BALING-PRESS.

1,321,548.  Specification of Letters Patent.  Patented Nov. 11, 1919.

Application filed July 22, 1918. Serial No. 246,147.

*To all whom it may concern:*

Be it known that I, JAMES H. PEARSON, a citizen of the United States, residing at Bloomfield, in the county of Greene and State of Indiana, have invented a new and useful Baling-Press, of which the following is a specification.

This invention relates to baling presses, one of its objects being to provide a baling press which will operate automatically to fasten ties about the bale, there being tripping means operated by the bale being formed, for throwing into action successively after the bale has reached desired proportions, a set of needles, tie twisters and cutters, all of the parts operating in perfectly timed relation and without requiring attention from any one.

A further object is to provide simple and efficient means for coupling the needle mechanism to and uncoupling it from the reciprocating plunger of the machine thus to intermittently connect the needles to the drive mechanism at the proper times during the operation of the machine.

Another object is to provide twisting mechanism of simple and compact construction which is readily accessible, will not easily get out of order, and can be repaired without much trouble.

A still further object is to provide twisting mechanism which will be placed into operative relation with the driving mechanism at the proper time during the cycle of operations and will be thrown out of action immediately subsequent to the twisting action, the mechanism employed for this purpose being simple, compact and easily reached for repairs.

Another object is to provide a twister of novel form having combined with it a novel cutting mechanism whereby the tie will be severed in timed relation with the twisting action.

With the foregoing and other objects in view which will appear as the description proceeds, the invention consists of certain novel details of construction and combinations of parts which will be hereinafter more fully described and pointed out in the claims.

In the accompanying drawings the preferred form of the invention has been shown.

In said drawings,

Figure 1 is a side elevation of the complete machine.

Fig. 2 is a plan view.

Fig. 3 is an end elevation.

Fig. 4 is a section on line 4—4, Fig. 1, the feed hopper being removed.

Fig. 5 is a plan view of the bale operated wheel and adjacent parts.

Fig. 6 is a side elevation of said wheel and of the adjacent parts controlled thereby.

Fig. 7 is a front elevation of the mechanism shown in Fig. 6.

Fig. 8 is a perspective view of the guide and supporting bracket adapted to hold the toothed tripping wheel shown in Figs. 5, 6 and 7.

Fig. 9 is a view partly in plan and partly in section of a portion of the plunger and the mechanism coöperating therewith for coupling the needles to the drive mechanism.

Fig. 10 is a side elevation of the parts shown in Fig. 9.

Fig. 11 is a section on line 11—11, Fig. 9.

Fig. 12 is a plan view of the twisting and cutting mechanism.

Fig. 13 is a detail view showing the position of the needle and tie during the tying operation and while the needle is in its lowermost position.

Fig. 14 shows the positions of the needle, tie, etc., when the needle is brought to its raised or normal position.

Fig. 15 shows the relative positions of the parts at the beginning of the action of the twister.

Fig. 16 shows the relative positions of said parts at the completion of the twisting and cutting operation.

Referring to the figures by characters of reference, 1 designates front and rear supporting wheels carrying axles 2 carrying a press box structure 3 on which are mounted the various parts of the mechanism constituting the present invention. This press box is preferably made of slats suitably connected and any suitable tension means may be provided at the discharge end of the box for causing the walls of the box to engage the formed bale frictionally and retard its movement. Such an arrangement is old in the art and illustration and description thereof is not considered to be necessary in the present case.

A drive shaft 4 is extended transversely of and mounted on one end of the press box and is provided at one end with a pulley 5 adapted to receive motion through a belt, not shown, from a motor suitably located relative thereto. Fly wheels 6 are secured to this shaft and a small gear 7 is also secured thereto and meshes with a large gear 8 thereunder secured to a transverse shaft 9 having a crank 10. To this crank is connected a pitman 11 extending into and pivotally connected to a plunger 12 mounted to reciprocate within the press box 3. As shown in Fig. 9 the plunger is provided, on one side, with an attaching plate 13 from one end of which extends a laterally projecting ear 14 while to the other end of the plate is secured one end of a latch strip 15 which extends toward the ear 14 and has its free end normally pressed outwardly by a spring 16. The ear 14 and the latch strip are adapted to reciprocate with the plunger and they both work within a slot formed between two of the slats forming one side wall of the press box.

Brackets 17 are secured to one side of the press box 3 and are connected by parallel guide rods 18 on which is mounted a slide 19 having a lug 20 projecting from the inner side thereof and into the path of the ear 14. A wrist pin 21 extends laterally from the slide 19 and is engaged by one end of a connecting rod 22 for the purpose hereinafter described.

Pivotally mounted on the lower guide rod 18 close to the forward bracket 17 or, in other words, that bracket nearest the discharge end of the press box 3, is a releasing dog 23 the nose 24 of which normally projects inwardly between the rods 18 and into the path of the latch strip 15. The depending arm 25 of the dog normally extends over and engages the outer side of a holding lever 26 which is fulcrumed as at 27 upon the side of the press box 3 and has its upper portion offset laterally as shown at 28 in Fig. 11. Thus under normal conditions, and as shown in Fig. 11, the nose of the dog will be held in the path of the latch strip 15 and said strip will be pressed inwardly thereby during the forward stroke of the plunger, with the result that the latch strip will not engage the lug 20 on the return stroke of the plunger and the slide 19 will remain stationary. This will be apparent by referring to Fig. 9, which, as well as Figs. 10 and 11, shows the parts in normal or uncoupled positions.

A spring 29 is connected at one end to the lever 26 and at its other end to the press box and serves to pull the lever normally in position to hold the dog 24 as shown in Figs. 1 and 11.

The front or advancing face of the follower 12 is provided with a transverse groove 30 and pivotally connected to the sides of the press box 3 are retaining fingers 31 having their forward ends projecting toward each other and adapted, when the follower is in its advanced position, to be received by the end portions of the groove 30. These fingers serve to hold the compressed material against retrograde movement during the return stroke of the follower or plunger 3.

When the plunger is in its advanced position it is under, and closes, the outlet in the bottom of a feed hopper 32, said outlet being shown at 33 in Fig. 2. When the plunger moves back to its starting point, however, it withdraws from under said outlet and permits material to fall into the path of the plunger so as to be forced thereby into the press box toward the outlet or front end thereof. Parallel slots 34 are formed in the sides of the hopper and extending into the hopper through the slots, are packing fingers 35. One pair of these fingers may be located at each side of the hopper and the fingers of each pair are mounted, between their ends, upon cranks 36 intermediate the ends of a shaft 37. The shafts 37 at the two sides of the hopper are journaled in brackets 38 and provided with gears 39 meshing with gears 40 secured to the ends of a transverse shaft 41. A sprocket 42 is secured to this shaft and is driven by a chain 43 receiving motion from a sprocket 44 on the shaft 4. Thus during the operation of the drive shaft 4 the plunger 12 and the packing fingers 35 are operated continuously. The outer ends of the fingers 35 are pivotally connected to restraining rods 45 extending downwardly therefrom and pivoted to the press box. Accordingly, as the cranks 36 are rotated, the outer ends of the fingers 35 being held by the pivoted rods, said fingers will press downwardly upon material fed into the hopper 32, force it through the outlet 33, withdraw laterally of the machine into the slots 34, move upwardly within the slots and then move inwardly and downwardly upon the material in the hopper. As the fingers are arranged to operate successively, a constant packing action will be exerted thereby thus to insure proper feeding of material into the press box.

Secured to one side of the press box, near the discharge end thereof is a bracket 46 having a depending portion 47 provided with an upstanding guide ear 48. On this bracket is journaled a wheel 49 having pointed teeth 50 extending from the periphery thereof and which project through the wall of the press box into position to be engaged and rotated by the compressed material being forced longitudinally within said press box. This wheel rotates freely and has upstanding inner and outer lugs 51 and 52. A lever 53 is fulcrumed as at 54 upon the upper portion of one side of the press box and extends downwardly, the lower end thereof being provided with a foot 55 and an elevated laterally extending ear 56. A rod 57 is pivotally connected, at one end, to this ear and, at its other end, to the lever 26 so that the spring 29 thus serves to hold the foot 55 normally in the path of the outer lug 52 on the toothed wheel 49.

Extending transversely under the press box is a shaft 58 to each end of which is secured a crank arm 59. Another arm 60 is extended from one end of the shaft and is pivotally connected to one end of the rod 22 heretofore referred to. A yoke 61 straddles the press box 3 and the sides thereof are connected to the respective arms 59 by links 62. One side of the yoke has a finger 63 depending therefrom and overhanging the wheel 49, this finger coöperating with the lug 51 in the manner hereinafter described. Secured to the yoke 61 are parallel arcuate needles 64 concentric with the fulcrum of the yoke and each provided on one side of the point thereof, with a wire receiving recess 65 forming a hook. If desired a roller 66 may be arranged in the recess.

Secured to the top of the press box, along the front of the outlet 33 of hopper 32 is a channeled member 67 open at the front and ends and provided with openings 68 extending downwardly therethrough for the reception of the needles when the yoke 61 is actuated in the manner hereinafter described. A wire receiving notch is formed in the wall of each of the uppermost openings 68, as shown in Figs. 12, 13 and 14, at 69, and extending longitudinally within the channel member and slidable upon the bottom surface of the top thereof, is a strip 70 having notches normally registering with the notches 69, the notches in said strip 70 being shown at 71. A bell crank lever 72 is arranged at one end of the member 67 and one end of the lever projects into a notch in the strip 70 while the other end thereof has a spring 73 connected to it and serving to hold the strip 70 in normal position.

Upstanding from the member 67 adjacent the respective upper openings 68 are stems 74 and mounted for rotation on each stem is a gripping wheel 75 having radial fingers 76. These wheels are normally pressed downwardly upon the member 67 by springs 77 arranged on the stems 74. Each spring bears at its lower end on the gripping wheel thereunder while its upper end is engaged by a nut 78 on the stem and whereby the pressure exerted by the spring on the gripping wheel can be regulated. Pawls 79 are slidably mounted on the member 67, each pawl having a tooth 80 normally located back of one of the fingers 76, the end of each finger being enlarged and rounded as shown in Fig. 12 to present a proper bearing for engagement by the tooth of the pawl. A spring 81 is provided for each pawl to hold it pressed against the adjacent wheel 75 and another spring 82 engages each wheel to prevent it from rotating in the wrong direction. The pawls 79 are connected to arms 83 extending upwardly from a transverse shaft 84 and extending from one end of this shaft are arms 85 and 86 arranged side by side and extending across the face of a gear 87. This gear has a lug 88 on one face thereof and the arm 85 is adapted to be raised thereby during a portion of the rotation of the gear, thus to rotate shaft 84 and push the pawls 79 in one direction while, during another portion of the rotation of the gear 87 the lug will move against the arm 86 and push it downwardly, thereby returning the shaft 84 and pawls 79 to their normal positions.

The gear 87 is mounted to rotate on a stud 89 and meshes with a small gear 90 secured to a transverse shaft 91. A wheel 92 is loosely mounted on this shaft and is driven continuously by a belt 93 receiving motion from a wheel 94 on the drive shaft 4. A clutch 95 is feathered on the shaft 91 and is engaged by the end of a slide rod 96 connected to one arm of a bell crank lever 97. The other arm of this lever projects into the forked upper end 98 of a lever 99 which is fulcrumed on the side of the press box 3 and has a finger 100 which projects into the path of a stud 101 extending inwardly from the gear 87. The other end portion of the lever 99 is extended back of the guide ear 48 and terminates in an upwardly extending ear 102 lying in the path of a stud 103 on the arm 60. The lever 99 is of resilient material and when its lower portion is elevated, as shown in Fig. 6, the ear 102 is spaced from the wall of the press box and in position to be engaged by the stud 103. When the lower portion of said lever is pressed downwardly, however, the guide ear 48, which is inclined, will press the ear inwardly toward the wall of the press box and out of engagement with the stud 103.

Arranged close to the member 67 are bearings 104 in which are journaled inclined shafts 105. Each shaft has a spiral twisting finger extending from the lower end thereof, as shown at 106, said finger being under the opening 68 in the top of member 67 and being so held that the descending needle can pass the curved portion of the finger. A gear is secured to the upper end of each shaft 105, as shown at 107 and these gears mesh with gears 108 secured to longitudinal shafts 109. Additional gears 110 are secured to the forward ends of the shafts 109 and mesh with gears 111 on shaft 91. As shaft 91 is normally inactive it will be apparent that the twisting mechanism is likewise normally at rest.

An endless conveyer 112 can be arranged to receive completed bales from the machine, this conveyer receiving motion continuously through a sprocket 113, chain 114 and sprocket 115, the latter sprocket being revoluble with the wheel 92.

Supported at each side of the press box near the back end thereof is a spindle 116 adapted to hold a spool S of baling wire. The wire W from each spool is extended through a guide eye 117, thence under the press box and through a guide tube 118 to a needle receiving opening 119 in the bottom of the press box. From these openings the wires W are extended upwardly through the openings 68 and the ends thereof clamped between the member 67 and certain of the fingers 76 of wheels 75. Each wire is looped over the roller in one of the needles 64, as shown in Fig. 14. If desired a roller 120 can be provided at the outlet end of each guide tube 118 for engagement by the wire W and thus reduce friction.

With all of the parts positioned as herein described it will be apparent that when the drive shaft is actuated the plunger 12 will be reciprocated and will force the material being baled, against the vertical portions of the wires W extending upwardly across the press box. Thus the wires will be forced forwardly within the box and the compressed material, as it moves within the press box, will slowly rotate wheel 49. The wires W are thus slowly drawn from the spools and will extend under the bale, upwardly across the advancing end thereof, and back along the top of the bale to the gripping wheels where the ends of the wires W are held. The wheel 49 is so proportioned that when the bale reaches a predetermined size the lug 52 will move against the foot 55 of lever 53, thereby shifting the lever and pulling, through rod 57, upon the lever 26 which is thus shifted from back of the arm 25 of dog 23, and momentarily held against return movement. Therefore, as the plunger 12 moves forward the latch strip 15 will press laterally against the nose of said dog and swing it outwardly.

The latch strip, being unrestrained by the dog 25 will promptly snap into engagement with the lug 20 on the slide 19 so that, on the return movement of the plunger 12, the slide 19 will be moved therewith. As the plunger 12 now moves back toward the shaft 9, carrying the slide 19 with it, the rod 22 pulls on arm 60, thereby rotating the shaft 58 and causing the two arms 59 to pull, through the links 62, upon the yoke 61 carrying the needles 64. The fingers 31, which are pressed into the box 3 by springs 31', hold the compressed material while the plunger is moved back therefrom and the descending needles pass back of these fingers and enter the openings 119 in the bottom of the press box (see Fig. 13).

In passing downwardly each needle moves out of engagement with the upper portion of the wire engaged thereby close to the gripping wheel 75 and engages that portion of the wire adjacent the guide tube 118, said wire springing laterally into the hooked end of the needle. Just as the needles reach their lowermost positions, the finger 63 on the yoke 61 pushes against the lug 51, which, as shown in Fig. 5, has been brought to position in the path thereof. This action of the finger 63 against lug 51 will result in imparting a supplemental movement to the wheel 49 which will be sufficient to move the lug 52 away from the foot 55 and allow the spring 29 to pull lever 26 and foot 55 back to their normal positions. As the nose 24 of the dog acts as a counterbalance it will swing the arm 25 of said dog outwardly, as soon as the strip 15 moves away from the dog. Consequently when the lever 26 is returned in the manner described when the needles reach their lowermost positions, the lever 26 will reassume its normal position relative to the dog and hold said dog in position to depress the latch strip 15 on the next stroke of the plunger 12 and disengage it from the slide 19. Thus only a down and up stroke of the needles will take place at one operation and the needles will remain at rest until the wheel 49 has completed another rotation. During the forward stroke of the plunger 12 while the slide 19 is coupled thereto, the needles are swung upwardly to their normal positions, carrying with them loops of wire W drawn through the tubular guides 118. These loops are drawn up into the openings 68 so that one strand of each loop will be brought between two fingers 76 of a gripping wheel 75 and will also be positioned beside the end portion of the wire already engaged by the gripping wheel. See Fig. 15. These two portions located side by side will also extend across one side of the adjacent twister 106 as shown in said figure. Simultaneously with the arrival of the needles at their elevated positions the stud 103 presses downwardly against the end 102 of lever 99 and causes said lever to move in the direction of the arrows in Fig. 6. The guide ear 48 will spring the lower end of the lever inwardly toward the press box so as to escape past the stud 103 and be free to move upwardly to its normal position. During the actuation of the lever 99 by stud 103 the upper forked end of the lever will shift the mechanism controlled thereby to move clutch 95 and couple the rotating wheel 92 to the shaft 91. This results in the rapid rotation of the twisters so that the portions of the wires engaged thereby will be twisted together thus to leave continuous ties fastened about the bale. As the twisters are operating the gear 90 is rotating gear 87 in the direction indicated by the arrow in Fig. 6. Thus stud 88 will, immediately at the beginning of the rotation of the gears, lift the arm 85 and actuate the pawls 79 to rotate the gripping wheels one tooth, thereby to engage and hold the wires fed thereto by the needles. Shortly thereafter the stud 88 moves against the end of a lever 121 hung above gear 87 as shown in Fig. 6. This lever pulls through a rod 122 upon the lever 72, thereby causing the momentary actuation of the strip 70 and the severance of the wires W between the twisters and the gripping wheels. This leaves the wires in the positions shown in Fig. 14 and ties fastened about the bale. After the actuation of the cutting strip the stud 88 moves against the arm 86 and resets the pawls 79 and just prior to the completion of one revolution of the gear 87 the stud 101 comes against the finger 100 and returns lever 99 to its initial position, thereby uncoupling the shaft 91 from wheel 92. This resets all the parts of the machine and the completed bale will be forced from the machine by the bale being newly formed, said completed bale passing out onto the continuously operating conveyer 112.

What is claimed is:—

1. In a baling press the combination with a press box and a plunger adapted to reciprocate continuously, of a bale actuated wheel extending into the press box, a normally stationary downwardly extending needle adapted to swing about an axis extending transversely of the press box, a slide, a lever connected to and adapted to be operated by the slide, a link connection between the lever and the needle, a latch upon the follower, means for holding the latch normally inactive, means operated by the wheel for automatically releasing the latch to engage the slide at the completion of a compression stroke of the follower and move the slide with the follower during the movement of said follower in the opposite direction thereby to lower the needle, and means operated by the lowering of the needle for resetting the latch holding means thereby to disengage the plunger from the slide when the plunger completes its next compression stroke.

2. In a baling press the combination with a press box and a plunger adapted to reciprocate continuously, of a bale actuated wheel extending into the press box, a needle carrying yoke mounted to swing downwardly and upwardly relative to the press box, a slide, a lever adjacent the slide, a lever adjacent to the wheel, a connection between the levers, a latch upon the plunger, a dog engaged by one of the levers and normally held thereby to maintain the latch out of engagement with the slide, and means on the wheel for engaging the lever adjacent thereto to shift both of said levers and release the dog and latch.

3. In a baling press, the combination with a press box and means for compressing material therein, of an inclined spirally shaped twister, a downwardly extending needle movable about an axis extending transversely of the press box, a bale operated element, mechanism controlled by said element for shifting the needle downwardly to engage a wire and upwardly to feed the engaged wire to position across one side of and in contact with the twister, a continuously operating drive member, and means actuated by said mechanism when the needle is raised to normal position and the wire is fed to the twister, for coupling the twister to and uncoupling it from said drive member.

4. In a baling press, the combination with a press box and means for compressing material therein, of a spring pressed gripping wheel having radial fingers, a needle, means for actuating the needle to engage a wire and draw a loop thereof between two of the fingers, a continuously operating drive member, means for rotating the gripping wheel to engage and hold the wire adjacent thereto, and means operated by the movement of the needle while feeding wire to the gripping wheel, for coupling the wheel rotating means momentarily to the drive member.

5. In a baling press the combination with a press box and means for compressing material therein, of a revoluble spiral twisting element, a gripping wheel adjacent thereto, a continuously operating drive mechanism, a needle, means under the control of a bale being formed, for actuating the needle to engage a wire and draw a loop past the twister and the gripping wheel, means for rotating the gripping wheel to frictionally engage and hold the wire, and means operated by the movement of the needle past the gripping wheel during the feeding of a wire, for coupling the wheel rotating means momentarily to the drive mechanism and for coupling the twister to said mechanism.

6. In a baling press the combination with a press box and an apertured plate upon the box, of a spring pressed gripping wheel mounted for rotation on said plate and coöperating therewith to form a wire clamp, an inclined spiral twister below the plate and extending across the aperture therein, a needle movable within the aperture to draw a wire loop past the twister and wheel, separate means for rotating the wheel and twister when the needle brings the wire into engagement therewith, and means for cutting the wire between the twister and wheel upon the completion of the twisting operation.

7. In a baling press the combination with a press box and an apertured plate having a notch in the wall of the aperture, of a slidable cutting strip slidable on one face of the plate and having a recess normally registering with the notch in the plate, a needle movable within the aperture to draw a wire loop into the notches, a twister below the cutting strip, a wire gripping device above the strip, driving mechanism, and means for automatically coupling the gripping means, the twister and the cutting strip to the driving mechanism successively when the needle is in one position.

In testimony that I claim the foregoing as my own, I have hereto affixed my signature in the presence of two witnesses.

JAMES H. PEARSON.

Witnesses:
 MINOR F. PATE,
 GEORGE SULLIVAN.

Copies of this patent may be obtained for five cents each, by addressing the "Commissioner of Patents, Washington, D. C."